United States Patent [19]
Fukino

[11] Patent Number: 5,760,972
[45] Date of Patent: Jun. 2, 1998

[54] ZOOM LENS BARREL

[75] Inventor: Kunihiro Fukino, Fujisawa, Japan

[73] Assignee: Nikon Corporation, Tokyo, Japan

[21] Appl. No.: 707,531

[22] Filed: Sep. 4, 1996

[30] Foreign Application Priority Data

Sep. 18, 1995 [JP] Japan .................................. 7-238525

[51] Int. Cl.$^6$ .................................................. G02B 15/14
[52] U.S. Cl. ................................................ 359/701; 359/825
[58] Field of Search ...................................... 359/706, 701, 359/825, 830

[56] References Cited

U.S. PATENT DOCUMENTS 4,405,205  9/1983  Rossmann .............................. 359/706
4,824,207  4/1989  Kamata et al. ........................ 359/825

Primary Examiner—Georgia Y. Epps
Assistant Examiner—Thomas Robbins

[57] ABSTRACT

In order to provide a zoom lens barrel in which the direction of rotation of a zoom ring or a focus ring during the operation thereof can be independently determined even if use is made of a cam cylinder in which the mutual relation between the movement locus of a lens for focusing and the movement locus of a lens for focal length change cannot be destroyed, provision is made of a fixed cylinder, a zoom ring operated during a focal length change, a focus ring operated during focusing, a cam mechanism for moving each of lens units in the direction of the optical axis thereof by the rotational force of the zoom ring without rotating them about the optical axis, and moving the lens units in the direction of the optical axis while rotating them about the optical axis by the rotational force of the zoom ring, an interlocking ring rotatably fitted to the fixed cylinder, and a rotatable gear for transmitting the rotational force of the focus ring while reversing the direction thereof, and the interlocking ring guides the lens units in the direction of the optical axis, while rotating them about the optical axis by the rotational force transmitted from the rotatable gear.

10 Claims, 4 Drawing Sheets

ZOOM LENS BARREL

BACKGROUND OF THE INVENTION

1. Field of the Invention

This invention relates to a zoom lens barrel provided with an operating ring for focal length change and an operating ring for focusing.

2. Related Background Art

In recent years, other various focusing systems than the fore lens axial movement system have been proposed in order to contrive the compactness, higher performance and further higher variable power of a zoom lens barrel. The applicant proposed the "zoom lens barrel" of Japanese Patent Application No. 5-142475.

This zoom lens barrel has incorporated therein a zoom lens system comprised of a plurality of lens units including a focusing lens unit movable during a focal length change and having the functions of focal length change and focusing. In this zoom lens system, the movement locus of the focusing lens unit is formed by a combination of a movable cam for focusing and a movable cam for focal length change correction, and the movement locus of a movable non-focusing lens units which are not concerned in focusing is formed by a combination of the movable cam for focal length change correction and movable cams for focal length change corresponding to the respective non-focusing lens units. Further, this zoom lens barrel is designed such that the rotational movement amount of an operating ring for focusing (distance ring) for the focusing of the focusing lens unit becomes equal to the angle of rotation of a rotatable barrel prescribed by the movable cam for focusing.

In the designing of this zoom lens barrel, the movement locus of the plurality of lens units movable on the optical axis thereof for focal length change is first determined, but when this movement locus is to be expressed, the angle of rotation of the rotatable barrel for prescribing the movement amount of each lens unit in the direction of the optical axis is dealt with as a variable. Also, in order to secure the rotational movement amount for focusing of the focusing lens unit on the rotatable barrel to such a magnitude that can be utilized as the angle of rotation of the distance ring, the movement locus during the focal length change of the focusing lens unit is divided into a movement locus for focusing and a movement locus for focal length change correction. More particularly, the movement locus for focusing is determined so that the displacement amount of an imaging point may become sufficiently small at any focal length and any photographing length when focusing is effected, whereafter the movement locus for focal length change correction is determined in accordance with this movement locus for focusing. Subsequently, the movement locus for focal length change of each non-focusing lens unit is determined. The movement locus for focal length change is set such that the combined locus of the movement locus for focal length change and the movement locus for focal length change correction becomes the movement locus of the non-focusing lens units during a focal length change.

To make the amount of deflection of the imaging point sufficiently small in the above-described procedure, it is desirable to make all the divided movement loci non-linear.

Next, the movable cam for focusing, the movable cam for focal length change correction and the movable cam for focal length change corresponding to the movement locus for focusing, the movement locus for focal length change correction and the movement locus for focal length change, respectively, are formed on the rotatable barrel rotatable with the optical axis of the lens system as the center of rotation. Thereby, the movement locus of the focusing lens unit is prescribed by the movable cam for focusing and the movable cam for focal length change correction, and the movement loci of the movable non-focusing lens units are prescribed by the movable cam for focal length change correction and the movable cam for focal length change.

FIG. 3 of the accompanying drawings shows the construction of the above-described zoom lens barrel. FIGS. 4A and 4B of the accompanying drawings are developed views of a portion of a cam cylinder used in this zoom lens barrel (developed views of a portion of the cam cylinder as it is seen from the outside thereof). In FIG. 4A, there is shown the state of each cam pin when the cam cylinder is set at the wide angle end, and in FIG. 4B, there is shown the state of each cam pin when the cam cylinder is set at the telephoto end.

A fixed cylinder 1 is provided with a mount portion 1a. The fixed cylinder 1 is mounted on a camera body (not shown) through the mount portion 1a. An operating ring for focal length change (zoom ring) 2 and an aperture ring 3 are fitted to the outer periphery of the outer cylinder portion 1b of the fixed cylinder 1 for rotation by a predetermined angle. An operating ring for focusing (focus ring) 4 is fitted to the inner periphery of the outer cylinder portion 1b of the fixed cylinder 1 for rotation by a predetermined angle.

A cam cylinder (cam ring) 5 is slidably fitted to the inner periphery of the inner cylinder portion 1c of the fixed cylinder 1. The cam ring 5 effects rotation of a predetermined angle and a predetermined amount of movement in the direction of the optical axis while being fitted to the inner periphery of the inner cylinder portion 1c. The cam ring 5 is formed with a cam slot 5a corresponding to the aforedescribed movable cam for focal length change correction. A cam pin 6 studded in the inner cylinder portion 1c of the fixed cylinder 1 is fitted in the cam slot 5a.

Also, the cam ring 5 is formed with a guide groove 5b parallel to the optical axis. An interlocking pin 7 is studded in the interlocking portion 2a of the zoom ring 2. The interlocking portion 2a is inserted in an escape groove 1d with a gap therebetween, the escape groove 1d formed in the outer cylinder portion 1b of the fixed cylinder 1. The interlocking pin 7 is inserted in an escape groove 1e with a gap therebetween, the escape groove 1e formed in the inner cylinder portion 1c of the fixed cylinder 1, and further the tip end portion thereof is fitted in the guide groove 5b. Therefore, the cam ring 5 rotates only in the direction of rotation with the zoom ring 2.

A first lens unit G1 is held by a first lens unit holding cylinder 8. The sliding portion 8a of the first lens unit holding cylinder 8 is fitted to the outer periphery of the inner cylinder portion 1c of the fixed cylinder 1 for rectilinear movement by a predetermined amount in the direction of the optical axis. The sliding portion 8a is formed with a guide groove 8b parallel to the optical axis, and a cam slot 8c corresponding to the movable cam for focal length change of the first lens unit G1. A guide pin 1f provided on the outer periphery of the inner cylinder portion 1c of the fixed cylinder 1 is fitted in the guide groove 8b. A cam pin 9 is studded on the outer periphery of the cam ring 5. The cam pin 9 is inserted in an escape groove 1g with a gap therebetween, the escape groove 1g formed in the inner cylinder portion 1c of the fixed cylinder 1, and further the tip end portion thereof is fitted in the cam slot 8c.

A second lens unit holding cylinder 10 holding a second lens unit G2 is fitted to the inner periphery of the cam ring 5 for rotation by a predetermined angle and movement by a predetermined amount in the direction of the optical axis. Also, a third lens unit holding cylinder 11 holding a third lens unit G3 and a fourth lens unit holding cylinder 12 holding a fourth lens unit G4 are further fitted to the inner periphery of the cam ring 5 for rectilinear movement by a predetermined amount each in the direction of the optical axis.

A cam pin 13 is studded in the second lens unit holding cylinder 10. The lower portion of the cam pin 13 is fitted in a cam slot 5c corresponding to the movable cam for focusing of the second lens unit G2. The central portion of the cam pin 13 is inserted in an escape groove 1h and an escape groove 8d with a gap therebetween, the escape groove 1h formed in the inner cylinder portion 1c of the fixed cylinder 1, and the escape groove 8d formed in the sliding portion 8a of the first lens unit holding cylinder 8. The tip end portion of the cam pin 13 is fitted in a guide groove 4a formed in the inner cylinder portion of the focus ring 4 and parallel to the optical axis.

A cam pin 14 is studded in the third lens unit holding cylinder 11. The cam pin 14 is fitted in a cam slot 5d corresponding to the movable cam for focal length change of the third lens unit G3, and the tip end portion thereof is fitted in a guide groove 1i formed in the inner cylinder portion 1c of the fixed cylinder 1 and parallel to the optical axis.

A cam pin 15 is studded in the fourth lens unit holding cylinder 12. The cam pin 15 is fitted in a cam slot 5e formed in the cam ring 5 and corresponding to the movable cam for focal length change of the fourth lens unit G4, and the tip end portion thereof is fitted in a guide groove 1j formed in the inner cylinder portion 1c of the fixed cylinder 1 and parallel to the optical axis.

The zoom lens barrel of FIG. 3 having the above-described construction operates as follows.

The focal length changing operation will first be described.

When the zoom ring 2 is rotated, the cam ring 5 rotates through the intermediary of the interlocking portion 2a and the interlocking pin 7. At this time, the cam ring 5 is moved in the direction of the optical axis while rotating, by the cam pin 6 fitted in the cam slot 5a.

When the cam ring 5 is moved in the direction of the optical axis while rotating, the cam pin 9 provided on the cam ring 5 moves in the cam slot 8c of the first lens unit holding cylinder 8. In this case, the cam pin 9 moves while applying a force to the side of the cam slot 8c. Thus, a drive force from the cam pin 9 acts on the first lens unit holding cylinder 8, but since the guide pin if of the fixed cylinder 1 is fitted in the guide groove 8b of the sliding portion 8a, the first lens unit holding cylinder 8 rectilinearly moves in the direction of the optical axis without rotating relative to the fixed cylinder 1.

Also, the cam pin 13 has its tip end portion fitted in the guide groove 4a formed in the inner cylinder portion of the focus ring 4 and therefore rectilinearly moves in the direction of the optical axis with the rotation and movement of the cam ring 5. That is, the second lens unit holding cylinder 10 rectilinearly moves in the direction of the optical axis without rotating relative to the focus ring 4. The focus ring 4 is not interlocked with the zoom ring 2 and therefore is always stationary without being concerned in the focal length changing operation.

Also, the cam pin 14 has its tip end portion fitted in the guide groove 1i formed in the inner cylinder portion 1c of the fixed cylinder 1 and therefore rectilinearly moves in the direction of the optical axis with the rotation and movement of the cam ring 5. That is, the third lens unit holding cylinder 11 rectilinearly moves in the direction of the optical axis without rotating relative to the fixed cylinder 1. The fourth lens unit holding cylinder 12 rectilinearly moves in the direction of the optical axis without rotating relative to the fixed cylinder 1 because the tip end portion of the cam pin 15 is fitted in the guide groove 1j.

The focusing operation will now be described.

When the focus ring 4 is rotated, the second lens unit holding cylinder 10 rotates through the intermediary of the cam pin 13. Specifically, the cam pin 13 is fitted in the cam slot 5c of the cam ring 5 which is stationary during the focusing operation and in the guide groove 4a of the focus ring 4 and therefore, the second lens unit holding cylinder 10 moves in the direction of the optical axis while rotating in accordance with the cam slot 5c.

Now, in the aforedescribed zoom lens barrel, the function of each cam is primarily determined by the correlations among the movable cam for focusing, the movable cam for focal length change correction and the movable cam for focal length change. For example, in the cam slot 5c for focusing shown in FIGS. 4A and 4B, a position for setting the near side is located more downward as viewed in the Figures than a position for setting infinity (∞), but it is optically impossible to make this positional relation converse, that is, to locate the setting position for the near side above the setting position for infinity.

Therefore, in the aforedescribed zoom lens barrel, it has been impossible to determine the direction of rotation of the zoom ring and the direction of rotation of the focus ring independently of each other. Specifically, the direction of rotation of one operating ring has been restrained by the direction of rotation of the other operating ring in such a manner that when the rotating operation for the zoom ring for changing from the wide angle end side to the telephoto end side requires rightward rotation as viewed from the rear side of the zoom lens barrel, the rotating operation for the focus ring for changing from infinity to the near side is leftward rotation.

For example, when photographing is to be effected with several photo-taking lenses interchanged, if the directions of rotation of the zoom ring and the focus ring differ from one photo-taking lens to another, it becomes very cumbersome to a photographer, but even if an attempt is made to unify the ways to use these, it has been impossible to combine the direction of rotation of the zoom ring and the direction of rotation of the focus ring together in the structure of the aforedescribed zoom lens barrel.

SUMMARY OF THE INVENTION

It is the object of the present invention to provide a zoom lens barrel in which even if the function of each cam is primarily determined on a cam ring, the direction of rotation of a zoom ring and the direction of rotation of a focus ring can be set independently of each other.

According to a first mode of the present invention for achieving the above object, there is provided a zoom lens barrel provided with:

a fixed cylinder containing a plurality of lens units therein;

an operating ring for focal length change rotatably fitted to the fixed cylinder and operated during a focal length change;

an operating ring for focusing rotatably fitted to the fixed cylinder and operated during focusing; and a cam mechanism for moving the plurality of lens units in the direction of the optical axis by the rotational force of the operating ring for focal length change, and moving at least one of the plurality of lens units in the direction of the optical axis without rotating it about the optical axis by the rotational force of the operating ring for focal length change, and also moving it in the direction of the optical axis while rotating it about the optical axis by the rotational force of the operating ring for focusing, characterized by:

an interlocking ring rotatably fitted to the fixed cylinder; and a transmitting mechanism for transmitting the rotational force of the operating ring for focusing to the interlocking ring while reversing the direction of the rotational force;

the interlocking ring guiding the at least one lens unit in the direction of the optical axis by the cam mechanism while rotating it about the optical axis by the rotational force transmitted from the transmitting mechanism.

According to a second mode of the present invention for achieving the above object, there is provided a zoom lens barrel characterized in that in the first mode, the cam mechanism moves each of the plurality of lens units while effecting focal length change correction.

According to a third mode of the present invention for achieving the above object, there is provided a zoom lens barrel having:

a fixed cylinder;

an operating ring for focal length change rotatably mounted on the fixed cylinder;

an operating ring for focusing rotatably mounted on the fixed cylinder;

a cam cylinder slidably fitted to the inner peripheral surface of the fixed cylinder;

a plurality of lens unit holding cylinders slidably fitted to the inner peripheral surface of the cam cylinder; and a plurality of lens units which are held by the plurality of lens unit holding cylinders and at least one of which is a lens unit for focusing;

the operating ring for focal length change being provided with an interlocking portion for interlockingly rotating the cam cylinder when the operating ring for focal length change is rotatively operated;

each of the plurality of lens unit holding cylinders being provided with a cam pin;

the cam cylinder being formed with a plurality of cam slots for guiding the each cam pin when the cam cylinder is interlockingly rotated by the interlocking portion, thereby causing the lens unit of each of the lens unit holding cylinders to perform a focal length changing operation;

one of the plurality of cam slots in which is fitted the cam pin of the lens unit holding cylinder holding the lens unit for focusing guiding the cam pin when the operating ring for focusing is rotatively operated, in addition to during the focal length changing operation, thereby causing the lens units for focusing of the lens unit holding cylinder to perform a focusing operation;

characterized by:

an inner peripheral gear formed on the inner peripheral surface of the operating ring for focusing;

an interlocking ring formed with an outer peripheral gear on the outer peripheral surface thereof and rotatably fitted to the fixed cylinder with the outer peripheral gear opposed to the inner peripheral gear with a predetermined spacing provided therebetween; and a rotatable gear rotatably supported by the fixed cylinder while meshing with both of the inner peripheral gear of the operating ring for focusing and the outer peripheral gear of the interlocking ring;

the interlocking ring being provided with a guide portion extending toward the lens unit holding cylinder for the lens unit for focusing;

at least a portion of the guide portion extending parallel to the optical axis of the lens unit for focusing;

the lens unit holding cylinder for the lens unit for focusing being formed with a fitting hole in which at least a portion of the guide portion slidably fits only in a direction parallel to the optical axis.

According to a fourth mode of the present invention for achieving the above object, there is provided a zoom lens barrel characterized in that in the third mode, the cam cylinder is further formed with a cam slot for focal length change correction for moving the cam cylinder in the direction of the optical axis when the cam cylinder is rotated by the interlocking portion, thereby correcting the focal length changing operation of the each lens unit, and the fixed cylinder is further provided with a cam pin for focal length change correction fitted in the cam slot for focal length change correction.

According to a fifth mode of the present invention for achieving the above object, there is provided a zoom lens barrel characterized in that in the third or fourth mode, one of the plurality of lens unit holding cylinders except the lens unit holding cylinder holding the lens unit for focusing is formed with a lens unit holding cylinder side cam slot for causing the lens unit held by the lens unit holding cylinder to perform a focal length changing operation when the cam cylinder is rotated by the interlocking portion, and the cam cylinder is provided with a cam cylinder side cam pin which fits in the lens unit holding cylinder side cam slot.

According to a sixth mode of the present invention for achieving the above object, there is provided a zoom lens barrel characterized in that in the third, fourth or fifth mode, one of the plurality of lens unit holding cylinders except the lens unit holding cylinder holding the lens unit for focusing is disposed between the lens unit holding cylinder holding the lens unit for focusing and the interlocking ring and has a through-hole extending through the guide portion without contacting with the guide portion even when the guide portion rotates about the optical axis with the interlocking ring.

According to the first mode of the present invention, the transmitting mechanism transmits the rotational force of the operating ring for focusing to the interlocking ring while reversing the direction of the rotational force. The interlocking ring guides at least one lens unit by the cam mechanism while rotating it by the rotational force transmitted from the transmitting mechanism.

According to the second mode of the present invention, the cam mechanism moves the plurality of lenses while correcting the focal length change thereof.

According to the third mode of the present invention, when the operating ring for focal length change is rotatively operated, the cam cylinder is interlockingly rotated by the interlocking portion. The cam cylinder is formed with a plurality of cam slots for focal length change, and the cam pins of the respective lens unit holding cylinders are fitted in those cam slots. That is, with regard to such a lens unit holding cylinder in which a cam slot is spirally formed about the optical axis and the cam pin inserted in the cam slot is fitted in a groove in the direction of the optical axis which is stationary relative to the fixed cylinder, it is moved in the direction of the optical axis without rotating about the optical axis, with the rotation of the cam cylinder.

Also, that one of the plurality of cam slots in which is fitted the cam pin of the lens unit holding cylinder holding the lens unit for focusing guides the cam pin even when the operating ring for focusing is rotatively operated, in addition to during the focal length changing operation, to thereby focusing-operate the lens unit for focusing of the lens unit holding cylinder. When the operating ring for focusing is rotatively operated, the cam cylinder is stationary and therefore, the cam pin of the lens unit holding cylinder holding the lens unit for focusing is guided along the cam slot of the stationary cam cylinder, but if this cam slot is spirally formed about the optical axis, the lens unit for focusing will move in the direction of the optical axis while rotating about the optical axis. At this time, the direction of rotation of the lens unit for focusing is reversed relative to the direction of rotation of the operating ring for focusing.

Specifically, the reversal of the direction of rotation of the lens unit for focusing is effected by the rotatable gear rotatably supported on the fixed cylinder while meshing with both of the inner peripheral gear of the operating ring for focusing and the outer peripheral gear of the interlocking ring.

The rotational force of the interlocking ring is transmitted to the lens unit holding cylinder for the lens unit for focusing through the guide portion, which fits in the fitting hole of the lens unit holding cylinder for sliding movement only in a direction parallel to the optical axis. Accordingly, this lens unit holding cylinder is guided in a direction parallel to the optical axis while being rotated about the optical axis.

According to the fourth mode of the present invention, the cam pin for focal length change correction of the fixed cylinder fits in the cam slot for focal length change correction of the cam cylinder and therefore, the cam cylinder corrects the focal length changing operation of each lens unit while rotating.

According to the fifth mode of the present invention, the lens unit holding cylinder formed with the lens unit holding cylinder side cam slot is guided by the cam cylinder side cam pin of the cam cylinder fitted in the lens unit holding cylinder side cam slot.

According to the sixth mode of the present invention, in the through-hole of the lens unit holding cylinder disposed between the lens unit holding cylinder holding the lens unit for focusing and the interlocking ring, the guide portion rotates about the optical axis without contacting with the lens unit holding cylinder.

DESCRIPTION OF THE PREFERRED EMBODIMENTS

Figure 1:
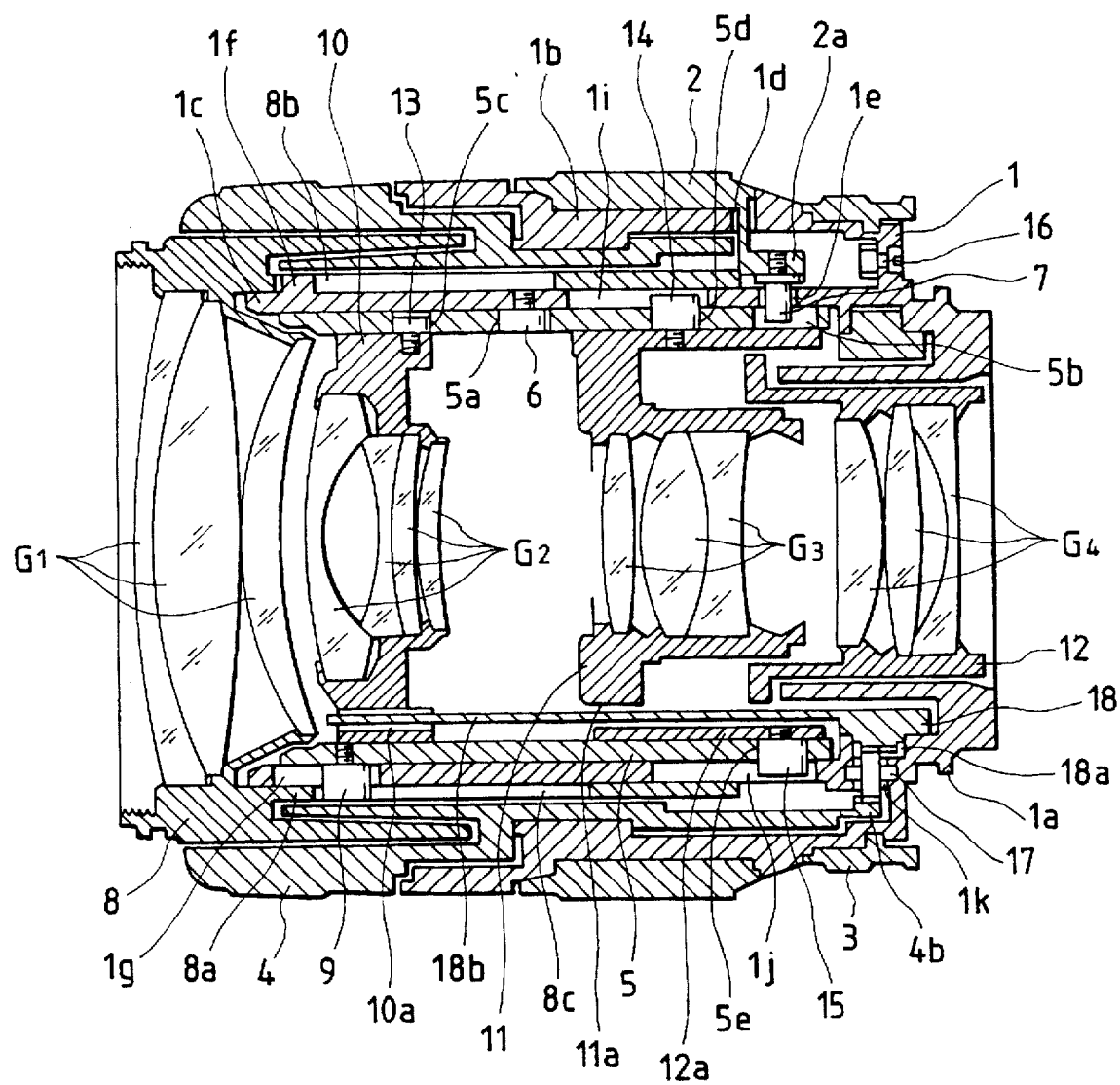
FIG. 1 is a longitudinal cross-sectional view of an embodiment of a zoom lens barrel according to the present invention.

A zoom lens barrel as an embodiment of the present invention will hereinafter be described with reference to the drawings. FIG. 1 is a longitudinal cross-sectional view of the zoom lens barrel.

A fixed cylinder 1 is provided with a mount portion 1a. The fixed cylinder is mounted on a camera body (not shown) through the mount portion 1a. An operating ring for focal length change (zoom ring) 2 and an aperture ring 3 are fitted to the outer periphery of the outer cylinder portion 1b of the fixed cylinder 1 for rotation by a predetermined angle each. An operating ring for focusing (focus ring) 4 is fitted to the inner periphery of the outer cylinder portion 1b of the fixed cylinder for rotation by a predetermined angle.

A cam cylinder (cam ring) 5 is slidably fitted to the inner periphery of the inner cylinder portion 1c of the fixed cylinder 1. This cam ring 5 is the same as the cam ring shown in FIGS. 4A and 4B, and effects a predetermined angle of rotation and a predetermined amount of movement in the direction of the optical axis while being fitted to the inner periphery of the inner cylinder portion 1c. The cam ring 5 is formed with a cam slot 5a corresponding to a movable cam for focal length change correction. A cam pin 6 studded in the inner cylinder portion 1c of the fixed cylinder 1 is fitted in the cam slot 5a. A movable cam for focusing and a movable cam for focal length change which will be described later, including the movable cam for focal length change correction, have already been described when the zoom lens barrel of FIG. 3 has been described and therefore need not be described in detail.

Also, the cam ring 5 is formed with a guide groove 5b parallel to the optical axis. An interlocking pin 7 is studded in the interlocking portion 2a of the zoom ring 2. The interlocking portion 2a is inserted in an escape groove 1d with a gap therebetween, the escape groove 1d being formed in the outer cylinder portion 1b of the fixed cylinder 1. The interlocking pin 7 is inserted in an escape groove 1e with a gap therebetween, the escape groove 1e being formed in the inner cylinder portion 1c of the fixed cylinder 1, and further has its tip end portion fitted in the guide groove 5b. Therefore, the cam ring 5 rotates with the zoom ring 2 only in the direction of rotation.

A first lens unit G1 is held by a first lens unit holding cylinder 8. The sliding portion 8a of the first lens unit holding cylinder 8 is fitted to the outer periphery of the inner cylinder portion 1c of the fixed cylinder 1 for rectilinear movement by a predetermined amount in the direction of the optical axis. The sliding portion 8a is formed with a guide groove 8b parallel to the optical axis, and a cam slot 8c corresponding to the movable cam for focal length change of the first lens unit G1. A guide pin 1f provided on the outer periphery of the inner cylinder portion 1c of the fixed cylinder 1 is fitted in the guide groove 8b. A cam pin 9 is studded on the outer periphery of the cam ring 5. The cam pin 9 is inserted in an escape groove 1g with a gap therebetween, the escape groove 1g being formed in the inner cylinder portion 1c of the fixed cylinder 1, and further has its tip end portion fitted in the cam slot 8c.

A second lens unit holding cylinder 10 holding a second lens unit G2 is fitted to the inner periphery of the cam ring 5 for rotation by a predetermined angle and for movement by a predetermined amount in the direction of the optical axis. Also, a third lens unit holding cylinder 11 holding a third lens unit G3 and a fourth lens unit holding cylinder 12 holding a fourth lens unit G4 are further fitted to the inner periphery of the cam ring 5 for rectilinear movement by a predetermined amount each in the direction of the optical axis.

A cam pin 13 is studded in the second lens unit holding cylinder 10. The cam pin 13 is fitted in a cam slot 5c formed in the cam ring 5 and corresponding to the movable cam for focusing of the second lens unit G2.

A cam pin 14 is studded in the third lens unit holding cylinder 11. The cam pin 14 is fitted in a cam slot 5d formed in the cam ring 5 and corresponding to the movable cam for focal length change of the third lens unit G3, and has its tip end portion fitted in a guide groove 1i formed in the inner cylinder portion 1c of the fixed cylinder 1 and parallel to the optical axis.

A cam pin 15 is studded in the fourth lens unit holding cylinder 12. The cam pin 15 is fitted in a cam slot 5e formed in the cam ring 5 and corresponding to the movable cam for focal length change of the fourth lens unit G4, and has its tip end portion fitted in a guide groove 1j formed in the inner cylinder portion 1c of the fixed cylinder 1 and parallel to the optical axis.

Figure 2:
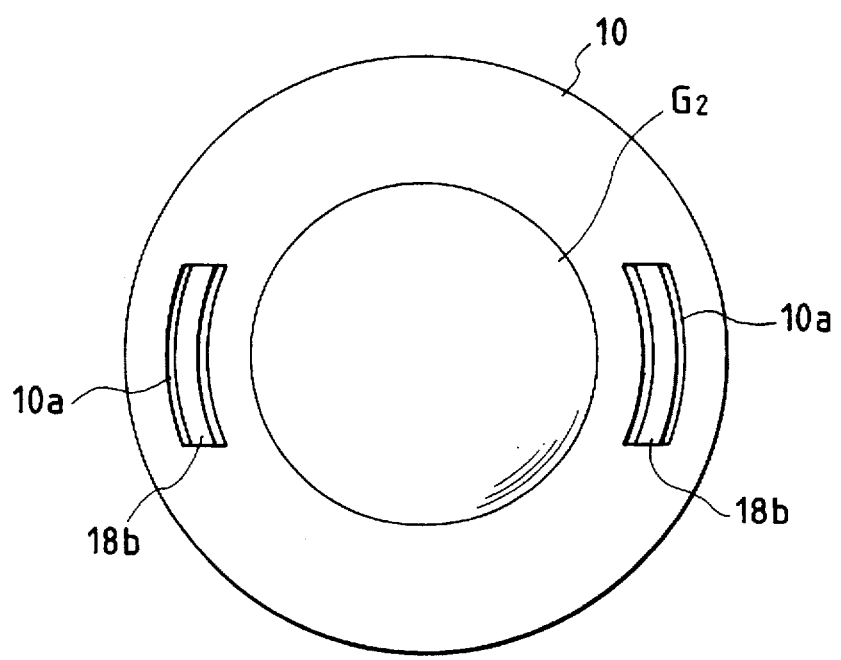
FIG. 2 is a front view of a second lens unit holding cylinder used in the zoom lens barrel of FIG. 1.

Also, an interlocking ring 18 is fitted to the inner peripheral surface of the rear end side (the mount portion 1a side) of the inner cylinder portion 1c of the fixed cylinder 1 for rotation by a predetermined angle. The interlocking ring 18 is formed with a guide portion 18b extending parallel to the optical axis of each lens unit. The third lens unit holding cylinder 11 and the fourth lens unit holding cylinder 12 are formed with cut-aways 11a and 12a, respectively, extending about the optical axis, and the guide portion 18b is inserted in these cut-aways with a gap therebetween. More particularly, the cut-away 11a is formed by cutting away the marginal edge of the third lens unit holding cylinder 11, and the cut-away 12a is formed by extending through an area located slightly inside from the marginal edge of the fourth lens unit holding cylinder 12. The second lens unit holding cylinder 10 is formed with a fitting hole 10a extending through in the direction of the optical axis, and the tip end portion of the guide portion 18b is fitted in the fitting hole 10a for sliding movement only in the direction of the optical axis. This fitting hole 10a is formed at the two locations with the optical axis interposed therebetween as shown in FIG. 2, and two guide portions 18b are provided correspondingly thereto. Of course, the number of these is not limited to that in the present embodiment.

Also, an inner peripheral gear 4b is formed on the inner peripheral surface of the rear end side of the focus ring 4. An outer peripheral gear 18a opposed to the inner peripheral gear 4b with a predetermined spacing therebetween is formed on the outer peripheral surface of the interlocking ring 18. Between the inner peripheral gear 4b and the outer peripheral gear 18a, there is disposed a rotatable gear 17 meshing with these. The rotatable gear 17 is rotatably supported on the fixed cylinder 1. By this rotatable gear 17, the rotational force of the focus ring 4 is transmitted to the interlocking ring 18 with the direction of rotation thereof reversed. The lengths of the aforedescribed cut-aways 11a and 12a about the optical axis are set such that the guide portion 18b does not contact with each lens unit holding cylinder when the guide portion 18b rotates about the optical axis with the interlocking ring 18.

Also, the zoom lens barrel according to the present embodiment is capable of effecting auto focus (AF) driving, and a coupling gear 16 for transmitting the AF drive force from the camera body is rotatably provided on the mount portion 1a of the fixed cylinder 1. This coupling gear 16 is in meshing engagement with the aforedescribed rotatable gear 17. In FIG. 1, in order to avoid the cumbersomeness of showing, the coupling gear 16 and the rotatable gear 17 are depicted separately from each other.

The operations of this zoom lens barrel will now be described.

The focal length changing operation will first be described.

Figure 4A:
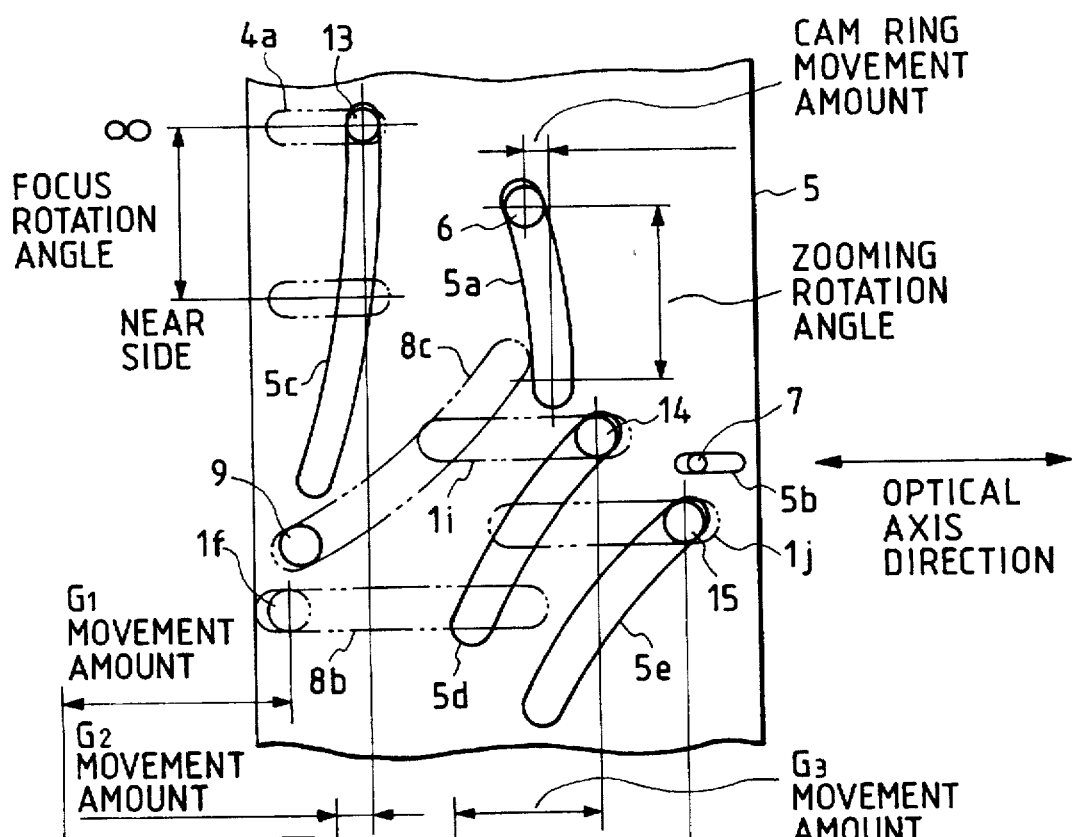
FIGS. 4A and 4B are developed views of a cam ring incorporated in a zoom lens barrel.
Figure 4B:
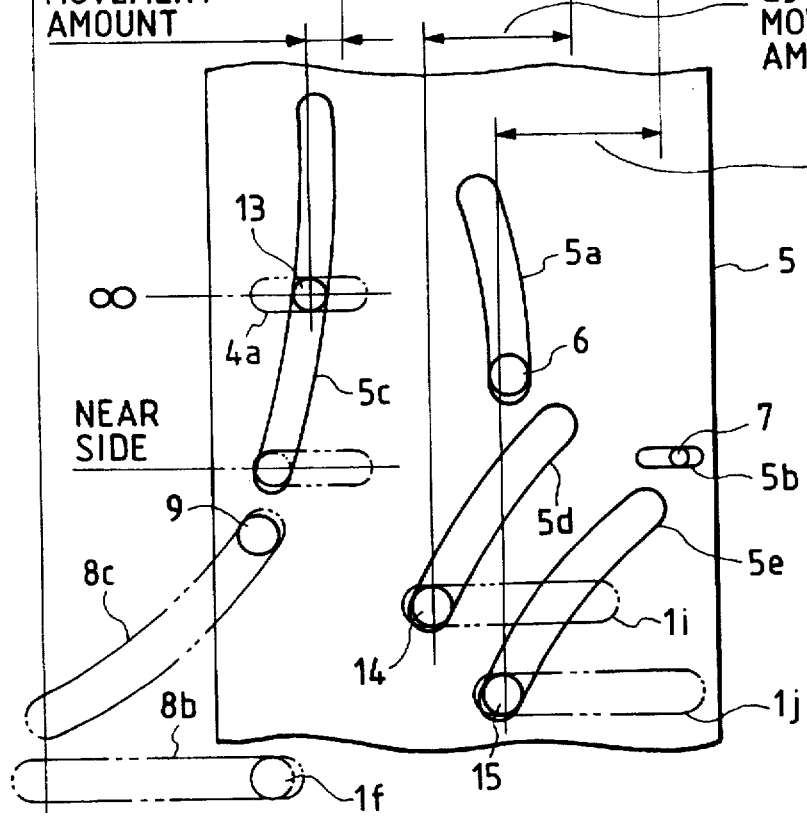

When the zoom ring 2 is rotated, the cam ring 5 rotates through the interlocking portion 2a and the interlocking pin 7. At this time, the cam ring 5 is moved in the direction of the optical axis while rotating, by the cam pin 6 fitted in the cam slot 5a, and carries out the focal length change correction of each lens unit. The state in which the cam ring 5 is moved from the wide angle end to the telephoto end while rotating is shown in FIGS. 4A and 4B.

When the cam ring 5 is moved in the direction of the optical axis while rotating, the cam pin 9 provided on the cam ring 5 moves in the cam slot 8c of the first lens unit holding cylinder 8. At this time, the cam pin 9 moves while applying a force to the side of the cam slot 8c. That is, the drive force from the cam pin 9 acts on the first lens unit holding cylinder 8, but since the guide pin 1f of the fixed cylinder 1 is fitted in the guide groove 8b of the sliding portion 8a, the first lens unit holding cylinder 8 rectilinearly moves in the direction of the optical axis without rotating relative to the fixed cylinder 1. This amount of movement (G1 movement amount) is prescribed by the cam slots 5a and 8c (see FIGS. 4A and 4B).

Also, since the cam pin 13 provided on the outer peripheral surface of the second lens unit holding cylinder 10 is fitted in the cam slot 5c and the guide portion 18b is fitted in the fitting hole 10a of the second lens unit holding cylinder 10 for sliding movement in the direction of the optical axis, the second lens unit holding cylinder 10 rectilinearly moves in the direction of the optical axis with the aforedescribed rotation and movement of the cam ring 5. Specifically, the second lens unit holding cylinder 10 rectilinearly moves in the direction of the optical axis without rotating relative to the focus ring 4. This amount of movement is represented as G2 movement amount in FIGS. 4A and 4B. The focus ring 4 is always stationary without being concerned in the focal length changing operation because it is not interlocked with the zoom ring 2.

Also, the cam pin 14 has its tip end portion fitted in the guide groove 1i formed in the inner cylinder portion 1c of the fixed cylinder 1 and therefore rectilinearly moves in the direction of the optical axis with the rotation and movement of the cam ring 5. That is, the third lens unit holding cylinder 11 rectilinearly moves in the direction of the optical axis without rotating relative to the fixed cylinder 1. This amount of movement is represented as G3 movement amount in FIGS. 4A and 4B. The fourth lens unit holding cylinder 12 rectilinearly moves in the direction of the optical axis without rotating relative to the fixed cylinder 1 because the tip end portion of the cam pin 15 is fitted in the guide groove 1j. This amount of movement is represented as G4 movement amount in FIGS. 4A and 4B.

The focusing operation will now be described.

When the focus ring 4 is rotated, the interlocking ring 18 rotates through the rotatable gear 17. The interlocking ring 18 is rotated in a direction opposite to the direction of rotation of the focus ring 4 by the rotatable gear 17. The guide portion 18b rotates in the same direction as the direction of rotation of the interlocking ring 18 without contacting with the third lens unit holding cylinder 11 and the fourth lens unit holding cylinder 12, and imparts a rotational force to the second lens unit holding cylinder 10. The second lens unit holding cylinder 10 moves in the direction of the optical axis while rotating about the optical axis in accordance with the locus of the cam slot 5c because the cam pin 13 on the outer peripheral surface thereof is fitted in the cam slot 5c.

As described above, according to the present embodiment, the direction of rotation of the focus ring 4 which has been primarily determined by the cam cylinder 5 can be reversed. Specifically, when the cam ring of FIGS. 4A and 4B is used, as compared with the prior art in which the direction of rotation of the focus ring 4 for changing from infinity to the near side could be set to only the leftward rotation as viewed from the rear side of the zoom lens barrel, the setting of the rightward rotation becomes possible. If use is made of a cam ring like the cam ring of FIGS. 4A and 4B as it has been turned over (a cam ring of which the outer peripheral surface has been replaced with the inner peripheral surface), the direction of rotation of the zoom ring 2 can also be reversed with the direction of rotation of the focusing 4 for changing from infinity to the near side kept leftward as viewed from the rear side of the zoom lens barrel.

Figure 3:
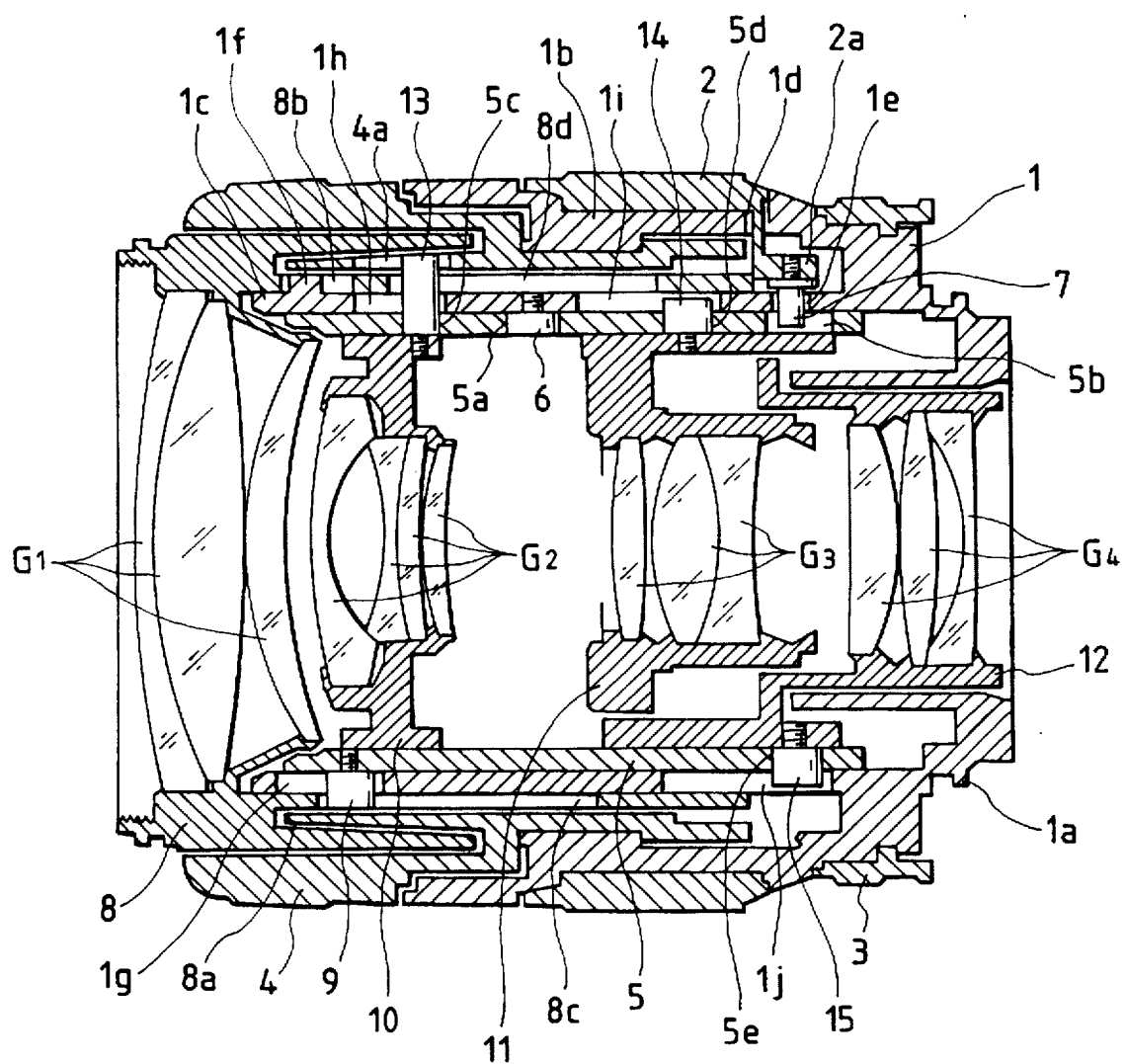
FIG. 3 is a longitudinal cross-sectional view of an example of the zoom lens barrel according to the prior art.

Further, according to the present embodiment, the escape groove 1h of the inner cylinder portion 1c of the fixed cylinder 1 and the escape groove 8a of the first lens unit holding cylinder 8 which have been necessary in the zoom lens barrel of FIG. 3 according to the prior art become unnecessary. The escape grooves 1h and 8d are escape grooves for the cam pin 13 which transmits the rotational force of the focus ring 4 to the first lens unit holding cylinder 8, but these escape grooves are formed relatively large because the cam pin 13 moves greatly in the direction of the optical axis. If the escape grooves become large, the member strength of the fixed cylinder 1 and the first lens unit holding cylinder 8 will correspondingly fall, but there is no such fear in the present embodiment.

According to the present invention, even if use is made of a cam cylinder in which the mutual relation between the movement locus of a lens for focusing and the movement locus of a lens for focal length change cannot be destroyed, it becomes possible to independently determine the direction of rotation of the zoom ring or the focus ring during the operation thereof.

What is claimed is:

1. A zoom lens barrel in which a lens unit is moved in the direction of the optical axis thereof to perform a zooming operation comprising:

a fixed cylinder;

an operating ring rotated relative to said fixed cylinder by an input from outside;

an interlocking ring provided inside said operating ring and engaged with said lens unit and rotated to thereby move said lens unit in the direction of the optical axis; and a transmitting mechanism which transmits a rotational force from said operating ring to said interlocking ring;

said transmitting mechanism comprising an odd number of rotatable members rotated between said operating ring and said interlocking ring to transmit the rotational force, and said operating ring and said interlocking ring being rotated in opposite directions.

2. The zoom lens barrel of claim 1, wherein said transmitting mechanism is provided near the end portion of said zoom lens barrel.

3. A zoom lens barrel provided with a plurality of lens units, comprising:

a fixed cylinder;

an operating ring to perform a zooming operation, rotatable fitted to said fixed cylinder;

an operating ring to perform a focusing operation, rotatably fitted to said fixed cylinder;

an interlocking ring rotatably fitted to said fixed cylinder and provided inside said operating ring, rotation of said interlocking ring causing at least one of said plurality of lens units to move in the direction of the optical axis; and a transmitting mechanism to transmit rotational force of said operating ring to said interlocking ring so that rotation of said operating ring causes said interlocking ring to rotate in an opposite direction than said operating ring.

4. The zoom lens barrel of claim 3, further comprising:

a cam mechanism which converts the rotational force of said interlocking ring into a force in the direction of the optical axis of said lens units.

5. The zoom lens barrel of claim 4, wherein said cam mechanism comprises a cam ring formed with a groove, and a pin provided on said at least one lens unit and engaged with said groove.

6. The zoom lens barrel of claim 3, wherein said transmitting mechanism is provided on the camera side of said zoom lens barrel, and a guide portion extending from said interlocking ring in parallelism to the optical axis is engaged with said at least one lens unit near the end portion thereof.

7. The zoom lens barrel of claim 3, wherein said transmitting mechanism comprises an inner gear formed on the inner periphery of said operating ring for focusing, an outer gear formed on the outer periphery of said interlocking ring, and an idle gear meshing with said outer gear and said inner gear.

8. A lens barrel having an optical axis extending therethrough, comprising:

a lens unit which is movable in the optical axis direction;

a first ring which is rotatable around the optical axis, the first ring engaged with the lens unit so that rotation of the first ring causes the lens unit to move in the optical axis direction;

a second ring which is rotatable around the optical axis; and a transmitting mechanism which, when the second ring is rotated, transmits rotational force of the second ring to the first ring so that the first ring rotates in the opposite direction than the second ring and the rotation of the second ring causes the lens unit to move in the optical axis direction.

9. A lens barrel as in claim 8, wherein the transmitting mechanism comprises:

a first gear engaged with the first ring;

a second gear engaged with the third ring; and a third gear which meshes the first gear with the second gear so that the transmitting mechanism transmits rotational force of the second ring to the first ring and the first ring rotates in the opposite direction than the second ring.

10. A lens barrel as in claim 8, wherein the transmitting mechanism comprises an odd number of gears so that the transmitting mechanism transmits rotational force of the second ring to the first ring and the first ring rotates in the opposite direction than the second ring.

* * * * *

UNITED STATES PATENT AND TRADEMARK OFFICE
CERTIFICATE OF CORRECTION

PATENT NO. : 5,760,972

DATED : June 2, 1998

INVENTOR(S) : Kunihiro Fukino

It is certified that error appears in the above-identified patent and that said Letters Patent is hereby corrected as shown below:

Col. 11, lines 63 and 64, (claim 3), change "rotatable" to --rotatably--.

Signed and Sealed this

Twenty-second Day of September, 1998

Attest:

BRUCE LEHMAN

Attesting Officer     Commissioner of Patents and Trademarks